(12) United States Patent
Liu et al.

(10) Patent No.: US 12,657,756 B2
(45) Date of Patent: Jun. 16, 2026

(54) USER INTERFACE DISPLAY SYSTEM, METHOD, COMPUTER DEVICE AND STORAGE MEDIUM

(71) Applicant: BOE Technology Group Co., Ltd., Beijing (CN)

(72) Inventors: Xin Liu, Beijing (CN); Yao Zhang, Beijing (CN); Haotian Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 319 days.

(21) Appl. No.: 18/292,911

(22) PCT Filed: Dec. 15, 2022

(86) PCT No.: PCT/CN2022/139276
§ 371 (c)(1),
(2) Date: Jan. 28, 2024

(87) PCT Pub. No.: WO2024/124480
PCT Pub. Date: Jun. 20, 2024

(65) Prior Publication Data
US 2025/0005780 A1 Jan. 2, 2025

(51) Int. Cl.
*G06T 7/70* (2017.01)
*G06F 9/451* (2018.01)
*G06V 10/70* (2022.01)

(52) U.S. Cl.
CPC ............... *G06T 7/70* (2017.01); *G06F 9/451* (2018.02); *G06V 10/70* (2022.01); *G06V 2201/07* (2022.01)

(58) Field of Classification Search
CPC ............ G06T 7/70; G06F 9/451; G06V 10/70
(Continued)

(56) References Cited

U.S. PATENT DOCUMENTS 11,048,925 B1 * 6/2021 Momcilovic ........ G06V 10/141
11,700,701 B2 * 7/2023 Zhang .................. F16M 11/125
361/807
(Continued)

FOREIGN PATENT DOCUMENTS

CN 106030484 A 10/2016
CN 106415447 A 2/2017
(Continued)

*Primary Examiner* — William D Titcomb
(74) *Attorney, Agent, or Firm* — HOUTTEMAN LAW LLC

(57) ABSTRACT

A user interface display system and method, a computer device and a storage medium are provided. The user interface display system includes an image acquisition module, a system control module and a display module. The image acquisition module is configured to acquire a scene picture; the system control module is configured to detect whether a target object is present in the scene picture, and track the target object and determine a current position of the target object in a scene in a case that the target object is present; determine a current coordinate point of the current position mapped to an interface coordinate system of a user interface according to the current position of the target object in the scene and a mapping relationship between a pre-established scene coordinate system and the interface coordinate system; and generate update information of interface components in the user interface.

20 Claims, 6 Drawing Sheets

(58) Field of Classification Search
USPC ......................................................... 382/103
See application file for complete search history.

(56) References Cited

U.S. PATENT DOCUMENTS

| | | | | |
|---|---|---|---|---|
| 11,823,618 | B2 * | 11/2023 | Liu | G09G 3/3208 |
| 2019/0121601 | A1 * | 4/2019 | Li | H04N 5/04 |
| 2019/0362559 | A1 * | 11/2019 | Dai | G06T 19/006 |
| 2020/0226789 | A1 * | 7/2020 | Ma | G06T 7/70 |
| 2022/0224881 | A1 * | 7/2022 | Gutierrez-Barragan | G06V 10/7747 |
| 2022/0319234 | A1 * | 10/2022 | Hu | G06T 7/70 |
| 2022/0342514 | A1 * | 10/2022 | Chao | G06F 3/0362 |
| 2022/0353484 | A1 * | 11/2022 | Miyata | H04N 13/282 |
| 2023/0136191 | A1 * | 5/2023 | Chang | H04N 23/90 348/169 |
| 2023/0300444 | A1 * | 9/2023 | Chang | H04N 23/675 |
| 2023/0334113 | A1 * | 10/2023 | Li | G06F 3/04845 |
| 2024/0098174 | A1 * | 3/2024 | Huang | G06F 9/451 |

FOREIGN PATENT DOCUMENTS

| | | | |
|---|---|---|---|
| CN | 106919246 | A | 7/2017 |
| CN | 108170282 | A | 6/2018 |
| CN | 108363572 | A | 8/2018 |
| CN | 111164971 | A | 5/2020 |
| CN | 107835403 | B | 6/2020 |
| CN | 115390664 | A | 11/2022 |
| WO | WO 03027827 | A1 | 4/2003 |
| WO | WO 2021197189 | A1 | 10/2021 |

* cited by examiner

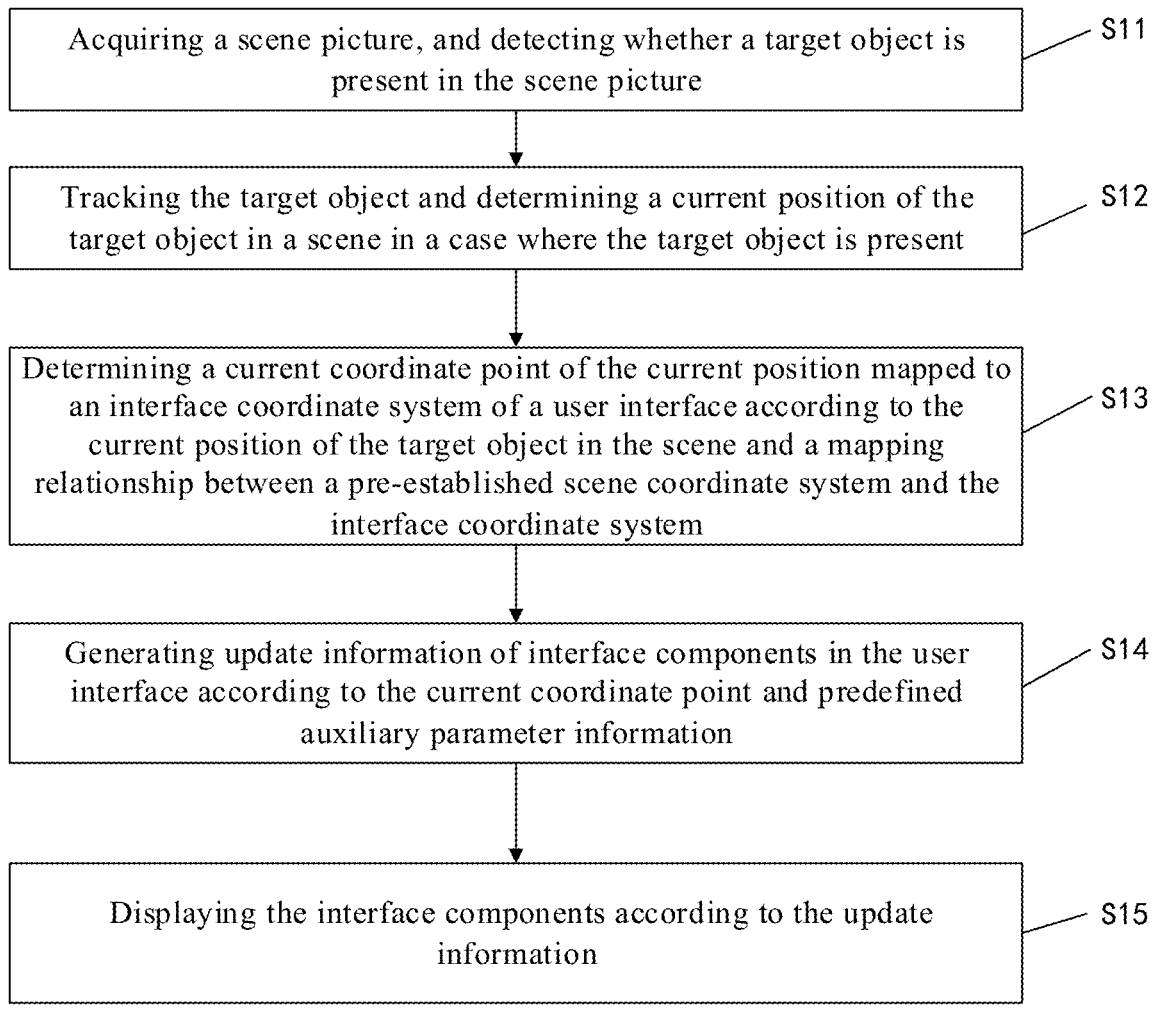

Acquiring a scene picture, and detecting whether a target object is present in the scene picture — S11

Tracking the target object and determining a current position of the target object in a scene in a case where the target object is present — S12

Determining a current coordinate point of the current position mapped to an interface coordinate system of a user interface according to the current position of the target object in the scene and a mapping relationship between a pre-established scene coordinate system and the interface coordinate system — S13

Generating update information of interface components in the user interface according to the current coordinate point and predefined auxiliary parameter information — S14

Displaying the interface components according to the update information — S15

FIG. 8

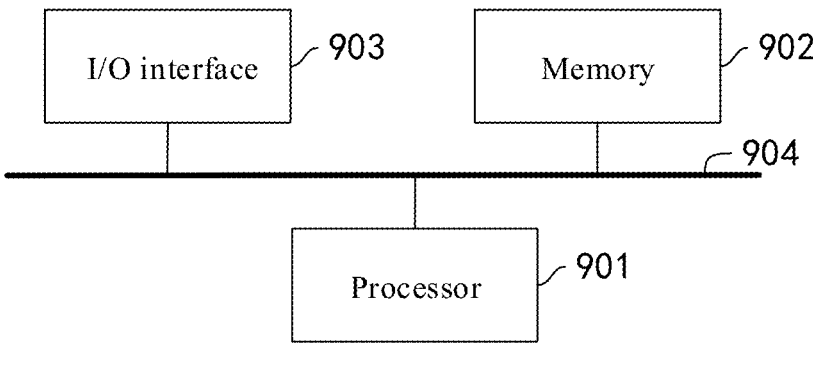

I/O interface — 903          Memory — 902

— 904

Processor — 901

USER INTERFACE DISPLAY SYSTEM, METHOD, COMPUTER DEVICE AND STORAGE MEDIUM

TECHNICAL FIELD

The present disclosure relates to the field of display technology, and in particular to a user interface display system, a user interface display method, a computer device and a storage medium.

BACKGROUND

With update and optimization of a user interface (UI) in a display device, more and more UI interfaces are combined with human-computer interaction to realize a 3D UI interface, so as to meet the immersive experience of an observer.

However, in a conventional 3D UI interface display method, an independent application (App) needs to be developed to establish a 3D scene, so as to enhance the panoramic visual experience of the observer. A large amount of hardware resources are required to create the 3D scene of the independent App, so that when other Apps are called, the system has a low compatibility, and functions of the other Apps are influenced.

SUMMARY

The present disclosure is directed to solving at least one of the technical problems in the related art and provides a user interface display system, a user interface display method, a computer device and a storage medium.

In a first aspect, a technical solution adopted to solve the technical problem in the related art is a user interface display system, including an image acquisition module, a system control module and a display module; wherein the image acquisition module is configured to acquire a scene picture; the system control module is configured to detect whether a target object is present in the scene picture, and track the target object and determine a current position of the target object in a scene in a case that the target object is present; determine a current coordinate point of the current position mapped to an interface coordinate system of a user interface according to the current position of the target object in the scene and a mapping relationship between a pre-established scene coordinate system and the interface coordinate system; and generate update information of interface components in the user interface according to the current coordinate point and predefined auxiliary parameter information; and the display module is configured to display the interface components according to the update information.

In some embodiments, the system control module includes a detection unit, an information determination unit, and an update information generation unit; the detection unit is configured to detect whether the target object is present in the scene picture; the information determination unit is configured to track the target object and determine the current position of the target object in the scene in a case that the target object is present; and determine the current coordinate point of the current position mapped to the interface coordinate system according to the current position of the target object in the scene and a mapping relationship between the pre-established scene coordinate system and the interface coordinate system; and the update information generation unit is configured to generate the update information of the interface components in the user interface according to the current coordinate point and the predefined auxiliary parameter information.

In some embodiments, the predefined auxiliary parameter information includes a predefined auxiliary locating point on the interface coordinate system and a dimensional scaling factor of each interface component; the target object includes a person; the detection unit is configured to perform face recognition on the scene picture and determine whether the target object is present; the current position includes a target key point; the information determination unit is configured to track the target object and determine a target key point in the face according to a face feature of the target object in a case where it is determined through the face recognition that the target object is present; and determine a current coordinate point corresponding to the target key point according to a mapping relationship between the target key point in the scene coordinate system and the interface coordinate system; and the update information generation unit is configured to generate the update information of the interface components according to the current coordinate point, the auxiliary locating point, and the dimensional scaling factor of each interface component.

In some embodiments, the system control module further includes a first pre-processing unit; and the first pre-processing unit is configured to determine an auxiliary locating point on the interface coordinate system according to an initial coordinate point of an initial position of the tracked target object mapped to the interface coordinate system and an initial position of each interface component in the user interface; and determine the dimensional scaling factor of each interface component according to the auxiliary locating point, the initial coordinate point and the initial position of each interface component.

In some embodiments, the user interface includes layers using the same interface coordinate system; the user interface including the layers includes a foreground layer and a background layer, and at least one intermediate layer between the foreground layer and the background layer; and a plurality of interface components are included; and the system control module further includes an interface control unit; the interface control unit is configured to control the display module to display different interface components in the foreground layer, the middle layer, and the background layer.

In some embodiments, the update information generation unit is configured to receive a component selection instruction for selecting an interface component, replace a dimensional scaling factor of the currently selected interface component with a target scaling factor, and generate the update information of each interface component according to the current coordinate point, the replaced target scaling factor and the predefined auxiliary locating point on the interface coordinate system.

In some embodiments, the update information generation unit is configured to receive a component selection instruction for selecting an interface component, and acquire a predefined dimensional scaling factor of each interface component; replace the dimensional scaling factor of the currently selected interface component with the dimensional scaling factor of the interface component in the foreground layer in a case where the currently selected interface component is not in the foreground layer of the user interface; and generate the update information of each interface component according to the current coordinate point, the replaced dimensional scaling factor and the predefined auxiliary locating point on the interface coordinate system.

In some embodiments, the current position includes a target key point and a depth distance reference point; the information determination unit is configured to track the target object and determine a target key point in the face according to a face feature of the target object in a case where it is determined through the face recognition that the target object is present; identify a shoulder feature of the target object; and take a point of a middle position of two shoulders as a depth distance reference point according to positions of the two shoulders in the scene coordinate system; and the update information generation unit is configured to determine a component scaling factor from the depth distance reference point and the target key point; and generate the update information of each interface component according to the component scaling factor, the current coordinate point, the predefined auxiliary locating point on the interface coordinate system and the dimensional scaling factor of each interface component.

In some embodiments, the information determination unit is configured to identify a pupil feature in the face, and take a point of a middle position of two pupils as the target key point according to positions of the two pupils in the scene coordinate system in a case where it is determined through the face recognition that the target object is present.

In some embodiments, the user interface includes at least one layer, including the background layer; the interface component includes the background image; and the system control module further includes an interface control unit configured to control the display module to display the background image in the background layer.

In some embodiments, the predefined auxiliary parameter information further includes size information of a visual window of the predefined user interface, a magnification factor and size information of the predefined background image; the target object includes a person; the detection unit is configured to perform face recognition on the scene picture and determine whether the target object is present; the current position includes a target key point; the information determination unit is configured to track the target object and determine a target key point in the face according to a face feature of the target object in a case where it is determined through the face recognition that the target object is present; and determine a current coordinate point corresponding to the target key point according to a mapping relationship between the target key point in the scene coordinate system and the interface coordinate system; and the update information generation unit is further configured to determine an auxiliary reference point at which the current coordinate point is centrosymmetric with respect to a geometric center of the visual window according to the current coordinate point and the size information of the visual window; and generate the update information of the background image according to the size information of the visual window, the magnification factor of the background image, the auxiliary reference point and the size information of the background image.

In some embodiments, the system control module further includes a second pre-processing unit; and the second pre-processing unit is configured to determine the size information of the background image according to the size information of the visual window and the magnification factor of the background image.

In some embodiments, the interface component includes at least one of a control, a status bar, a card bar, a background image.

In a second aspect, an embodiment of the present disclosure further provides a user interface display method, including: acquiring a scene picture, and detecting whether a target object is present in the scene picture; tracking the target object and determining a current position of the target object in a scene in a case where the target object is present; determining a current coordinate point of the current position mapped to an interface coordinate system of a user interface according to the current position of the target object in the scene and a mapping relationship between a pre-established scene coordinate system and the interface coordinate system; generating update information of interface components in the user interface according to the current coordinate point and predefined auxiliary parameter information; and displaying the interface components according to the update information.

In a third aspect, an embodiment of the present disclosure further provides a computer device, including: a processor, a memory and a bus, wherein the memory stores machine-readable instructions executable by the processor; the processor and the memory is communicated with each other over the bus when the computer device is running; the machine-readable instructions, when executed by the processor, perform the steps of the user interface display method in the above embodiment.

In a fourth aspect, an embodiment of the present disclosure further provides a non-transitory computer-readable storage medium with a computer program stored thereon, wherein the computer program, when being executed by a processor, performs the steps of the user interface display method in the above embodiment.

BRIEF DESCRIPTION OF DRAWINGS

FIG. 5b is a schematic diagram of the updated interface components of FIG. 5a;

FIG. 8 is a flowchart of a user interface display method according to an embodiment of the present disclosure; and FIG. 9 is a schematic diagram of a structure of a computer device according to an embodiment of the present disclosure.

DETAIL DESCRIPTION OF EMBODIMENTS

Figure 1:
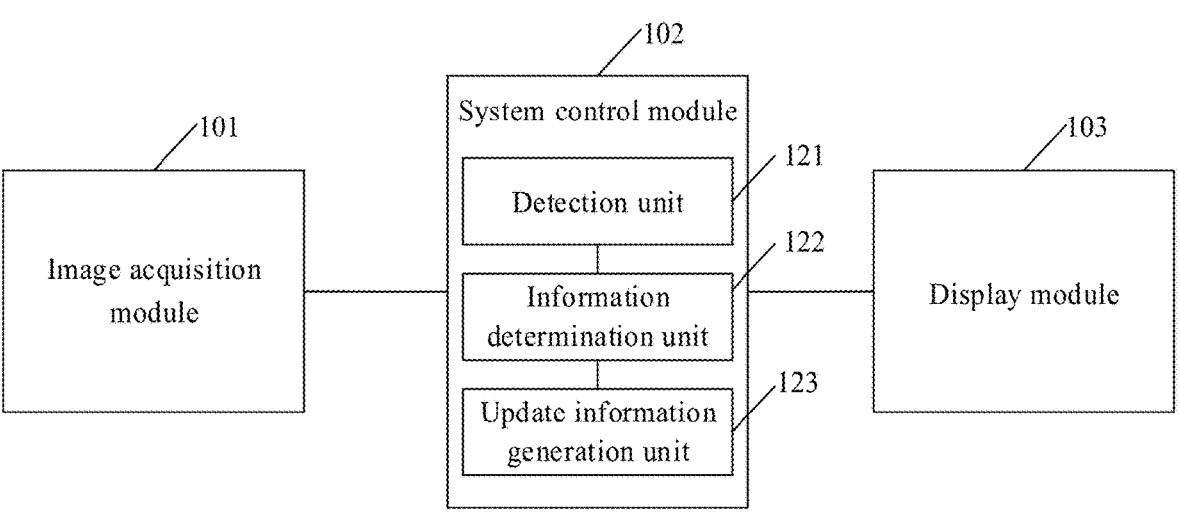
FIG. 1 is a schematic diagram of a structure of a user interface display system according to an embodiment of the present disclosure.

In order to enable the objects, technical solutions and advantages of the embodiments of the present disclosure to be more apparent, the technical solutions in the embodiments of the present disclosure will be described clearly and completely with reference to the drawings in the embodiments of the present disclosure. It is obvious that the described embodiments are only a part, not all, of the embodiments of the present disclosure. Generally, components of the embodiments of the present disclosure, as described and illustrated in the drawings herein, could be arranged and designed in a wide variety of different configurations. Thus, the detailed description of the embodiments of the present disclosure provided in the drawings is not intended to limit the scope of the claimed present disclosure, but is merely representative of selected embodiments of the present disclosure. All other embodiments, which can be derived by a person skilled in the art from the embodiments of the present disclosure without making any creative effort, shall fall within the protection scope of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Reference to "a plurality or some" in the present disclosure means two or more. The term "and/or" describes an association of objects associated with each other, including three relationships. For example, A and/or B may represent: A alone, or A and B, or B alone. The character "/" generally indicates that the object before the character "/" and the object after the character "/" associated with each other are in an "or" relationship.

In the related art, in a conventional 3D UI interface display method, an App needs to be developed to establish a 3D scene, so as to enhance the panoramic visual experience of the observer. A large amount of hardware resource support is required to create the 3D scene of the independent App, so that when other Apps are called, a system has a low compatibility, and the application of other software functions is influenced.

Based on this, the embodiment of the present disclosure provides a user interface display system, which includes an image acquisition module, a system control module, and a display module; wherein the image acquisition module is configured to acquire a scene picture; the system control module is configured to detect whether a target object is present in the scene picture, and track the target object and determine a current position of the target object in the scene in the case that the target object is present; determine a current coordinate point of the current position mapped to an interface coordinate system of a user interface according to the current position of the target object in the scene and a mapping relationship between a pre-established scene coordinate system and the interface coordinate system; generate update information of interface components in the user interface according to the current coordinate point and predefined auxiliary parameter information; the display module is configured to display the interface components according to the update information.

In an embodiment of the present disclosure, the image acquisition module integrated in the system acquires the scene picture of the surrounding environment where the system is located, and further, the system control module detects whether the target object is present in the scene picture, and the target object is tracked in real time in the case where the target object is present, so as to determine the current position of the target object in the scene. The current coordinate point mapped on the user interface is found according to the current position; the update information of the interface components in the user interface is generated by using the current coordinate point and the predefined auxiliary parameter information, that is, moving positions and/or zooming positions of the interface components in the user interface are calculated by using a space perspective principle; the display module may display the interface components according to the update information, such as movement of the interface components with the target object, equal scaling, etc. A relatively real 3D scene experience may be simulated in the 2D display mode by using the principle of parallax, and the 3D interactive effect is simulated in the 2D display mode. Thus, compared with a case where an application software is independently developed to realize a 3D scene, in the embodiment of the present disclosure, the functional modules are uniformly integrated in the user interface display system, so that hardware resources can be saved, and a compatibility of UI interface display and other applications can be better achieved. In addition, the relatively real 3D scene is simulated by using the space perspective principle, so that the development process of 3D scene software is simplified, and the software maintenance and iteration cost is reduced.

The user interface display system in the embodiment of the present disclosure may be applied to a terminal system with a large screen. The "large screen" may be understood as a display screen with a large screen size and a high resolution, such as an ultra high definition display screen with a screen size of more than 40 inches and a resolution of 8K.

Functional modules of a user interface display system according to an embodiment of the present disclosure will be described in detail below. FIG. 1 is a schematic diagram of a structure of a user interface display system according to an embodiment of the present disclosure. As shown in FIG. 1, the user interface display system includes an image acquisition module 101, a system control module 102, and a display module 103.

The image acquisition module 101 is configured to acquire a scene picture. The image acquisition module 101 may be a camera integrated in the user interface display system, and is configured to capture a scene picture of an environment where the camera is located, where the camera continuously captures the scene picture, and the scene picture is updated in real time. For a period of time, a dynamic target object or a still picture or the like may appear in the scene picture.

The target object in the embodiment of the present disclosure may be a preset object having specific characteristics, such as a person, or a particular selected object or the like.

The system control module 102 may be a processor of the user interface display system, and is configured to process the acquired scene picture to obtain update information of the user interface, that is, update information of each interface component in the user interface. The system control module 102 includes a detection unit 121, an information determination unit 122, and an update information generation unit 123.

The detection unit 121 is configured to detect whether a target object is present in the scene picture. Specifically, the detection unit 121 is configured to perform image feature extraction on the scene picture, process the extracted feature, and determine whether or not the target object is present. If the target object is present, a current position of the target object in the scene is determined, that is, a coordinate point of the target object in a scene coordinate system is determined. Here, the scene coordinate system may be a pre-established two-dimensional coordinate system of the scene picture captured by the camera. Alternatively, the scene coordinate system may be a spatial coordinate system of an environment in which the camera is located. Optionally, in order to simplify the algorithm and save hardware resources, the scene coordinate system in the embodiment of the present disclosure adopts a two-dimensional coordinate system that is easier to establish, and thus, the determined current position of the target object in the scene is a two-dimensional coordinate point in the scene coordinate system.

The information determination unit 122 is configured to track the target object and determine the current position of the target object in the scene in a case that the target object is present. That is, in the case where it is determined that the target object is present, the target object is tracked. It may be understood that the camera is configured to acquire the scene picture in real time, and locate the two-dimensional coordinate point of the target object in the scene coordinate system in real time, so as to realize the target trajectory tracking.

Figure 2:
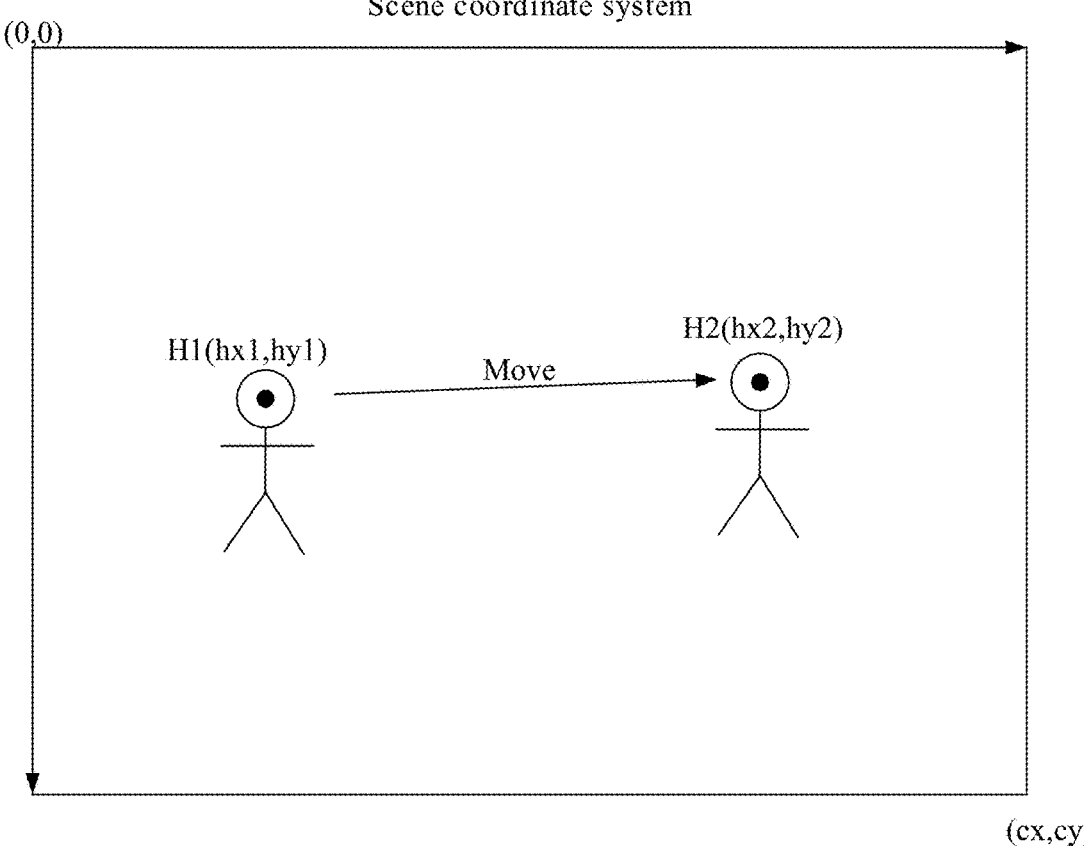
FIG. 2 is a schematic diagram illustrating trajectory tracking according to an embodiment of the present disclosure.

By way of example, FIG. 2 is a schematic diagram illustrating trajectory tracking according to an embodiment of the present disclosure. As shown in FIG. 2, a previous position H1 (hx1, hy1) is within (0,0) to (cx, cy), cx is a maximum value of the abscissa of the scene picture in a scene coordinate system, and cy is a maximum value of the ordinate of the scene picture in the scene coordinate system. When an observer moves, a start point is H1 (hx1, hy1), an end point is H2(hx2, hy2), that is, the current position H2. At this time, a displacement hxm=hx2−hx1 is obtained, and hym=hy2−hy1. The end point here is a position point in the tracking process, and is not a start position point of the target object.

The information determination unit 122 is configured to determine a current coordinate point of the current position mapped to an interface coordinate system of a user interface according to the current position of the target object in the scene and a mapping relationship between a pre-established scene coordinate system and the interface coordinate system. Here, a storage unit in the system control module 102 stores the mapping relationship between the pre-established scene coordinate system and the interface coordinate system of the user interface. The information determination unit 122 is specifically configured to map a two-dimensional coordinate point of the current position in the scene coordinate system to the interface coordinate system according to the mapping relationship between the scene coordinate system and the interface coordinate system after determining the current position of the target object in the scene, and determine the current coordinate point mapped to the interface coordinate system.

Continuing with FIG. 2, a visual window of a screen has a maximum abscissa of xm and a maximum ordinate of ym. The information determination unit 122 is configured to determine an offset amount of movement (vxm, vym) according to the displacement hxm=hx2−hx1 and hym=hy2−hy1 of the target object, and determine the current coordinate point V(vx, vy) according to the offset amount (vxm, vym) and the previous coordinate point. Here, vxm/xm=hxm/cx, vym/ym=hym/cy.

The update information generation unit 123 is configured to generate the update information of the interface components in the user interface according to the current coordinate point and the predefined auxiliary parameter information. The current coordinate point may be understood as a reference point that enables the interface components in the user interface to move. The auxiliary parameter information is predefined parameter information used for assisting the current coordinate point to update states of the interface components, and is used for representing the association relationship between the current coordinate point and each interface component in the user interface. The details of the auxiliary parameter information may refer to the following description of a pre-processing unit, and thus is not detailed here. The update information of the interface components here may be, for example, movement information and/or scaling information of the interface components, where the movement information may include, for example, a movement trajectory or an end coordinate point, and the like; the scaling information may include, for example, a scaling ratio, a scaling reference point, and the like. The movement trajectory, the end coordinate point, the scaling ratio and the scaling reference point here are all information in the interface coordinate system.

The display module 103 is configured to display the interface components according to the update information. For example, the interface components with updated positions are displayed. The position update may be a movement and/or a zoom of the interface components within the visual window or the like.

In the above units, the real-time interaction between each interface component in the user interface and the target object is realized by constructing the association relationship between the current position of the target object and the current coordinate point of the user interface and by utilizing the auxiliary parameter information (the association relationship between the current coordinate point and each interface component in the user interface), the 3D interaction effect is simulated through the 2D display mode and the interaction experience of the user is improved.

In some embodiments, the target object includes a person. The detection unit 121 is specifically configured to identify at least part of the features of the human body and determine whether the target object is present. In particular, some features may be selected that are capable of representing a higher intelligibility of the person, such as a facial feature (including a feature of five sense organs), a head feature, a torso feature, or the like.

Optionally, the detection unit 121 is specifically configured to perform face recognition on the scene picture, and determine whether the target object is present. Specifically, the face features in the scene picture are identified, it is judged whether a picture feature meeting the face features is present or not. If the picture feature meeting the face features is present, it is determined that the target object is present, and otherwise, it is determined that the target object is not present.

The current position includes a target key point. The information determination unit 122 is specifically configured to track the target object and determine a target key point in the face according to a face feature of the target object in a case where it is determined through the face recognition that the target object is present. For example, in the case where it is determined that the target object is present, the two-dimensional coordinate point of the target object in the scene coordinate system is located in real time, thereby achieving the target trajectory tracking. Meanwhile, the target key point in the human face is determined according to the face features of the target object, such as the feature of the five sense organs, specific face bones or the like. The target key point may be, for example, a two-dimensional coordinate point of the detected five sense organs in the scene coordinate system, a two-dimensional coordinate point of a bone key point in the scene coordinate system, or the like.

The information determination unit 122 is specifically configured to determine a current coordinate point corresponding to the target key point according to the target key point and a mapping relationship between the scene coordinate system and the interface coordinate system. For example, according to the mapping relationship between the scene coordinate system and the interface coordinate system, the target key point in the scene coordinate system is mapped into the interface coordinate system, and the mapped current coordinate point is determined.

The predefined auxiliary parameter information includes a predefined auxiliary locating point on the interface coordinate system and a dimensional scaling factor of each interface component. The update information generation unit 123 is configured to generate update information of the interface components according to the current coordinate point, the auxiliary locating point, and the dimensional scaling factor of each interface component.

Here, the auxiliary locating point is a two-dimensional coordinate point on the interface coordinate system, and is used for assisting in locating the position of each interface component in the user interface. For example, the auxiliary locating point A' is used for assisting in locating the position of the interface component 31, and the auxiliary locating point B' is used for assisting in locating the position of the interface component 31 and/or the interface component 32. The dimensional scaling factor of each interface component may be determined based at least on an initial position of each interface component in the user interface and the auxiliary locating point. The dimensional scaling factor of each interface component is used for assisting in locating the position of each interface component.

In some embodiments, the interface component includes at least one of a control, a status bar, a card bar, a background image. The control may be a software entry in a UI interface, and is usually presented in the UI interface in the form of a software icon; the status bar may be used for displaying a status of a currently opened window or software in the UI interface, for example, the status bar includes a status of a plurality of opened folders, or a status of other software applications, or may be a bar for prompting information, such as a "screenshot" bar, a "data" bar, or the like; the card bar may be a window in the UI interface for displaying picture or text information. The background image is, for example, a wallpaper in the UI interface, etc.

In some embodiments, the system control module 102 further includes a first pre-processing unit; the first pre-processing unit is configured to determine an auxiliary locating point on the interface coordinate system according to an initial coordinate point of an initial position of the tracked target object mapped to the interface coordinate system and an initial position of each interface component in the user interface. The dimensional scaling factor of each interface component is determined according to the auxiliary locating point, the initial coordinate point and the initial position of each interface component. Here, the initial position is a position of the target object in the scene coordinate system when the detection unit 121 detects the target object for the first time. A position of the initial position mapped to the interface coordinate system is the initial coordinate point. The initial position of each interface component initialized in the user interface is known.

Figure 3A:
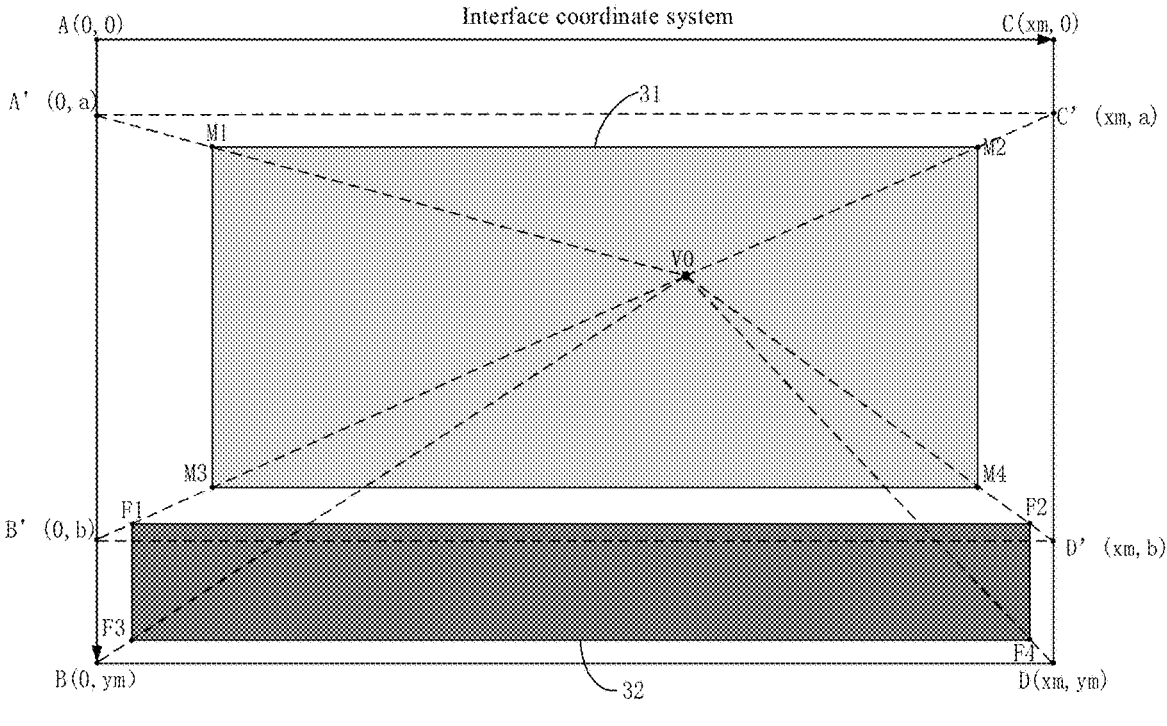
FIG. 3a is a schematic diagram illustrating a positional relationship between auxiliary positioning points and interface components on an interface coordinate system according to an embodiment of the present disclosure.

FIG. 3*a* is a schematic diagram illustrating a positional relationship between auxiliary locating points and interface components on an interface coordinate system according to an embodiment of the present disclosure. As shown in FIG. 3*a*, coordinates of vertices of a visual window in the user interface are known, that is, A(0, 0), B(0, ym), C(xm, 0), and D(xm, ym). Here, the visual window is a screen window of the UI interface that may be viewed by the user. The initial coordinate point is V0. An initial position of the interface component 31 (e.g., the card bar) includes coordinates of four vertices denoted as M1, M2, M3, and M4, respectively; an initial position of the interface component 32 (e.g., status bar) includes coordinates of four vertices denoted as F1, F2, F3, and F4, respectively. An auxiliary locating point A' is used for assisting in locating the interface component 31. Specifically, the auxiliary locating point A' is an intersection point of an extension line of a line connecting the initial coordinate point V0 and the point M1 and a line segment AB. An auxiliary locating point B' is used for assisting in locating the interface components 31 and 32, and is an intersection point of an extension line of a line connecting the initial coordinate point V0 and the point F1 and the line segment AB, and is an intersection point of an extension line of a line connecting the initial coordinate point V0 and the point M3 and the line segment AB. An auxiliary locating point C' is used for assisting in locating the interface component 31. Specifically, the auxiliary locating point C' is an intersection point of an extension line of a line connecting the initial coordinate point V0 and the point M2 and a line segment CD. An auxiliary locating point D' is used for assisting in locating the interface components 31 and 32, and is an intersection point of an extension line of a line connecting the initial coordinate point V0 and the point F2 and the line segment CD, and is an intersection point of an extension line of a line connecting the initial coordinate point V0 and the point M4 and the line segment CD. At the same time, V0, F3 and B are on a same straight line, and V0, F4 and D are on a same straight line.

A dimensional scaling factor of the interface component 31 is a ratio of A'M1 to A'V0, also C'M2 to C'V0, also B'M3 to BV0, also D'M4 to D'V0, all denoted as m. Here, m=B'M3/BV0=A'M1/A'V0=C'M2/C'V0=D'M4/D'V0. A dimensional scaling factor of the interface component 32 is a ratio of B'F1 to B'V0, also D'F2 to D'V0, also BF3 to BV0, also DF4 to DV0, all denoted as f. Here, f=B'F1/B'V0=D'F2/D'V0=BF3/BV0=DF4/DV0.

Figure 3B:
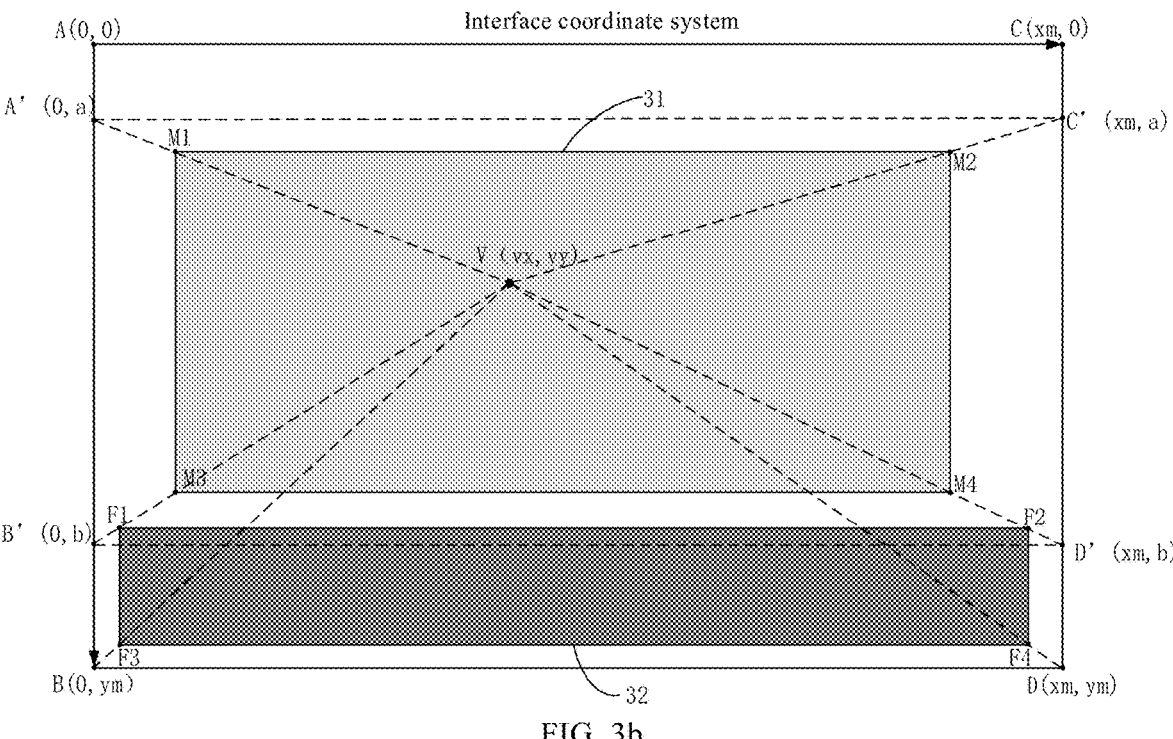
FIG. 3b is a schematic diagram illustrating a positional relationship between a current coordinate point and interface components on an interface coordinate system according to an embodiment of the present disclosure.

The update information generation unit 123 is specifically configured to generate the update information of each interface component according to the current coordinate point, the auxiliary locating point, and the dimensional scaling factor of each interface component. By way of example, FIG. 3*b* is a schematic diagram illustrating a positional relationship between a current coordinate point and interface components on an interface coordinate system according to an embodiment of the present disclosure. As shown in FIG. 3*b*, the current coordinate point V(vx, vy), the auxiliary locating point A'(0, a), the auxiliary locating point B'(0, b), the auxiliary locating point C'(xm, a), the auxiliary locating point D'(xm, b), the dimensional scaling factor m of the interface component 31, and the dimensional scaling factor f of the interface component 32 are known, update information of the interface component 31 (that is, updated M1, M2, M3, and M4), and update information of the interface component 32 (that is, updated F1, F2, F3, and F4) are determined. The updated M1, M2, M3 and M4 are as follows:

$$M1 = [m \times vx, \ a + m/(vy - a)]$$

$$M2 = [xm - m \times (xm - vx), \ a - m \times (a - vy)]$$

$$M3 = [m \times vx, \ b - m \times (b - vy)]$$

$$M4 = [xm - m \times (xm - vx), \ b - m \times (b - vy)]$$

The updated F1, F2, F3, and F4 are as follows:

$$F1 = [f \times vx, \ b - f \times (b - vy)]$$

$$F2 = [xm - f \times (xm - vx), \ b - f \times (b - vy)]$$

$$F3 = [f \times vx, \ ym - f \times (ym - vy)]$$

$$F4 = [xm - f \times (xm - vx), \ ym - f \times (ym - vy)]$$

Here, a, b, f, and m are constants, and may be set according to design requirements, which are not particularly limited in the embodiment of the present disclosure.

It should be noted that, at any time, A (0, 0), B (0, ym), C (xm, 0), D (xm, ym), A' (0, a), B' (0, b), C' (xm, a), and D' (xm, b) are fixed, V, M1 and A' are located on a same straight line, V, M2 and C' are located on a same straight line, V, M3 and B' are located on a same straight line, V, M4 and D' are located on a same straight line, V, F1 and B' are located on a same straight line, V, F2 and D' are located on a same straight line, V, F3 and B are located on a same straight line, and V, F4 and D are located on a same straight line. Therefore, the positions of the interface components are continuously updated as the current coordinate point V is continuously changed.

In the units, the interface components may move as the target object moves by utilizing the association relationship between the target object and the current coordinate point and the association relationship between the current coordinate point and each interface component, thereby realizing a dynamic interaction between the target object and each interface component.

Figure 4A:
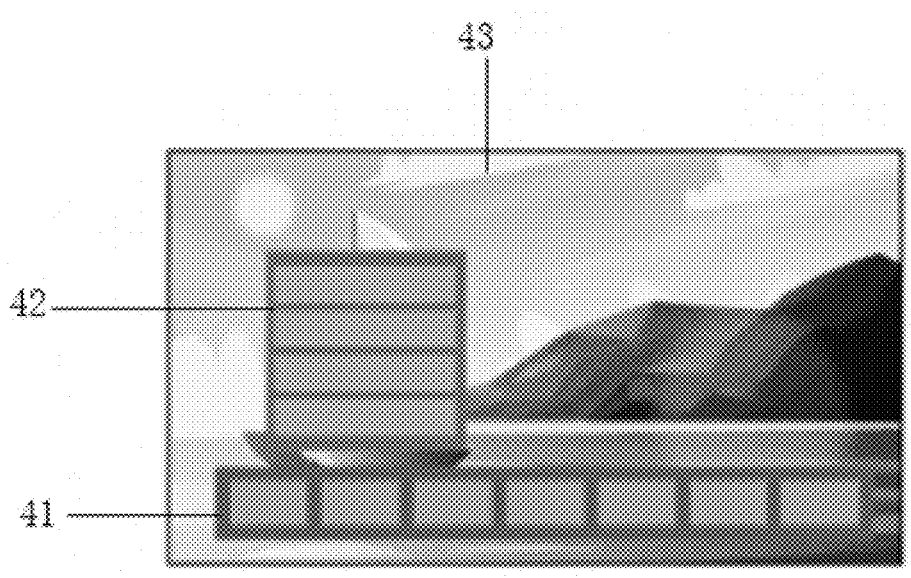
FIG. 4a is a schematic front view of a user interface according to an embodiment of the present disclosure.
Figure 4B:
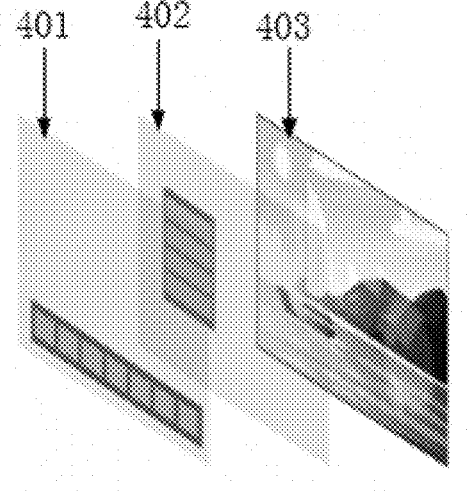
FIG. 4b is a schematic diagram of a layered user interface according to an embodiment of the present disclosure.

In some embodiments, FIG. 4*a* is a schematic front view of a user interface according to an embodiment of the present disclosure; FIG. 4*b* is a schematic diagram of a layered user interface according to an embodiment of the present disclosure. As shown in FIG. 4*a* and FIG. 4*b*, the user interface includes layers using the same interface coordinate system; the user interface including the layers includes a foreground layer 401 and a background layer 403, and at least one intermediate layer 402 located between the foreground layer 401 and the background layer 403; a plurality of interface components are included, such as a status bar 41, a card bar 42, and a background image 43, as shown.

The system control module 102 further includes an interface control unit; the interface control unit is configured to control the display module 103 to display different interface components in the foreground layer, the middle layer, and the background layer. For example, as shown in FIG. 4*b*, the interface control unit is configured to control the display module 103 to display the status bar 41 in the foreground layer, the card bar 42 in the middle layer, and the background image 43 in the background layer. In the embodiment of the present disclosure, the user interface is layered, which creates the vertical feeling of the picture through the parallax principle, and can present a relatively real 3D interface display effect for the user.

In some embodiments, in order to further improve the user interaction experience, when the user selects the interface component in the middle layer, the user interface display system may further adjust the interface component in the middle layer to the foreground layer for display. Specifically, the currently selected interface component is zoomed into display, so as to highlight the interface component currently selected by the user.

One possible implementation is that the update information generation unit 123 is specifically configured to receive a component selection instruction for selecting an interface component, and acquire a predefined dimensional scaling factor of each interface component; replace the dimensional scaling factor of the currently selected interface component with the dimensional scaling factor of the interface component positioned in the foreground layer in the case where the currently selected interface component is not positioned in the foreground layer of the user interface; and generate update information of each interface component according to the current coordinate point, the replaced dimensional scaling factor and the auxiliary locating point on the predefined interface coordinate system.

Figure 5A:
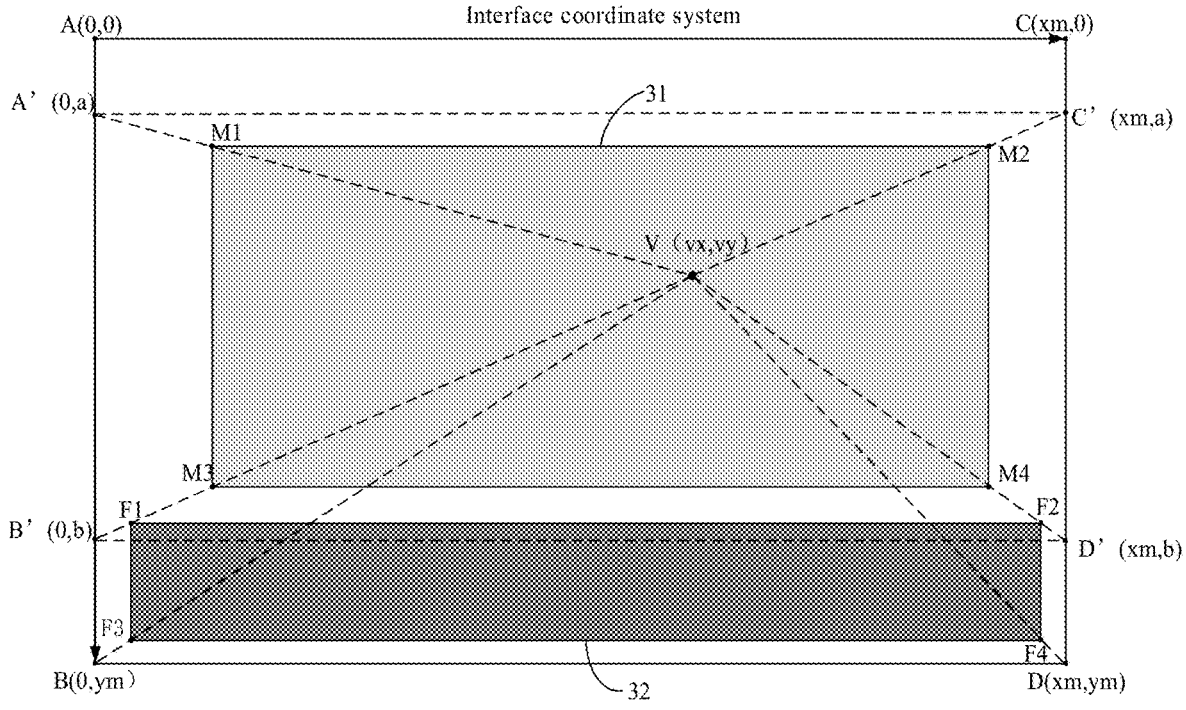
FIG. 5a is a schematic diagram of interface components without being updated according to an embodiment of the present disclosure.
Figure 5B:
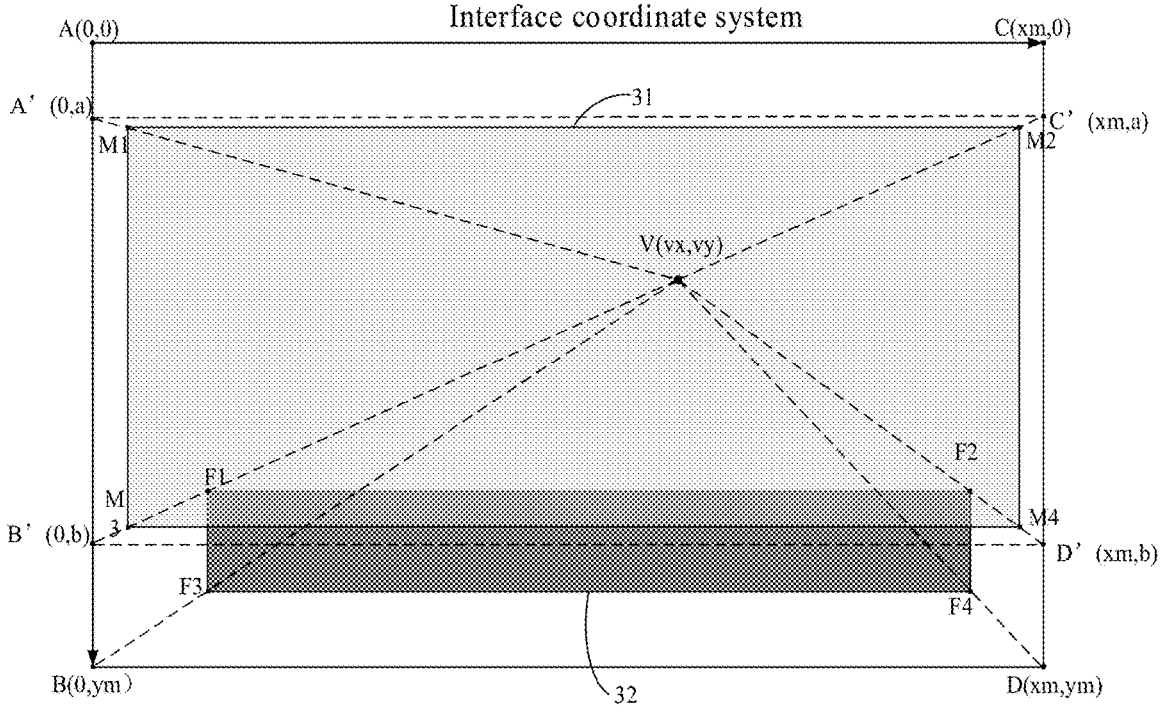

By way of example, FIG. 5*a* is a schematic diagram of interface components without being updated according to an embodiment of the present disclosure; FIG. 5*b* is a schematic diagram of the updated interface components of FIG. 5*a*. As shown in FIGS. 5*a* and 5*b*, the component selection instruction may be an instruction of one interface component located in the middle layer selected by the user, for example, when the card bar 42 is selected, the dimensional scaling factor m of the card bar 42 is known, and the dimensional scaling factor m of the card bar 42 is replaced with the dimensional scaling factor f of the status bar 41, and the update information of the card bar 42 and the update information of the status bar 41 are generated according to the current coordinate point V (vx, vy), the replaced dimensional scaling factor and the auxiliary locating point A' (0, a), the auxiliary locating point B' (0, B), the auxiliary locating point C' (xm, a) and the auxiliary locating point D' (xm, B) on the predefined interface coordinate system. The updated M1, M2, M3 and M4 are as follows:

$$M1 = [f \times vx, \; a + f \times (vy - a)]$$

$$M2 = [xm - f \times (xm - vx), \; a - f \times (a - vy)]$$

$$M3 = [f \times vx, \; b - f \times (b - vy)]$$

$$M4 = [xm - f \times (xm - vx), \; b - f \times (b - vy)]$$

The updated F1, F2, F3, and F4 are as follows:

$$F1 = [m \times vx, \; b - m \times (b - vy)]$$

$$F2 = [xm - m \times (xm - vx), \; b - m \times (b - vy)]$$

$$F3 = [m \times vx, \; ym - m \times (ym - vy)]$$

$$F4 = [xm - m \times (xm - vx), \; ym - m \times (ym - vy)]$$

Here, a, b, f, and m are constants, and may be set according to design requirements, which are not particularly limited in the embodiment of the present disclosure.

Another possible embodiment is that the update information generation unit 123 is specifically configured to receive a component selection instruction for selecting an interface component, replace a dimensional scaling factor of the currently selected interface component with a target scaling factor, and generate the update information of each interface component according to the current coordinate point, the replaced target scaling factor and the auxiliary locating point on the predefined interface coordinate system.

Here, the target scaling factor may be empirically determined data. For example, the target scaling factor is selected to be r. The component selection instruction may be an instruction of any interface component selected by the user, for example, the status bar 41 is selected, the dimensional scaling factor f of the status bar 41 is known, the dimensional scaling factor f of the status bar 41 is replaced by the target scaling factor r, and the update information of the status bar 41 is generated according to the current coordinate point V (vx, vy), the replaced dimensional scaling factor r, and the auxiliary locating points B' (0, b) and D' (xm, b) on the predefined interface coordinate system. The updated F1, F2, F3 and F4 are as follows:

$$F1 = [r \times vx, \; b - r \times (b - vy)]$$

$$F2 = [xm - r \times (xm - vx), \; b - r \times (b - vy)]$$

$$F3 = [r \times vx, \; ym - r \times (ym - vy)]$$

$$F4 = [xm - r \times (xm - vx), \; ym - r \times (ym - vy)]$$

Here, a, b, and r are constants, and may be set according to design requirements, which are not particularly limited in the embodiment of the present disclosure.

It should be noted that the status bar 41 obtained by using the replaced dimensional scaling factor r is zoomed into display as compared with the original status bar 41 obtained by using the non-replaced dimensional scaling factor f.

In some embodiments, the current position includes a target key point and a depth distance reference point. The information determination unit 122 is specifically configured to track the target object and determine a target key point in the face according to a face feature of the target object in a case where it is determined through the face recognition that the target object is present. A shoulder feature of the target object is identified, and a point of a middle position of two shoulders is taken as a depth distance reference point according to positions of the two shoulders in the scene coordinate system.

For example, in the case where it is determined that the target object is present, the two-dimensional coordinate point of the target object in the scene coordinate system is located in real time, thereby achieving the target trajectory tracking. Meanwhile, the target key point in the human face is determined according to the face features of the target object, such as the feature of the five sense organs, specific face bones or the like. The target key point may be, for example, a two-dimensional coordinate point of the detected five sense organs in the scene coordinate system, a two-dimensional coordinate point of a bone key point in the scene coordinate system, or the like. According to the shoulder feature, such as a shoulder bone feature, two-dimensional coordinate points of bone key points of two shoulders of the human body in the scene coordinate system are determined, and a central point of the two-dimensional coordinate points of the two shoulders (that is, a point of a middle of the two shoulders) is determined and is used as a depth distance reference point.

The update information generation unit 123 is specifically configured to determine a component scaling factor from the depth distance reference point and the target key point; and generate the update information of each interface component according to the component scaling factor, the current coordinate point, the auxiliary locating point on the predefined interface coordinate system and the dimensional scaling factor of each interface component.

Figure 6:
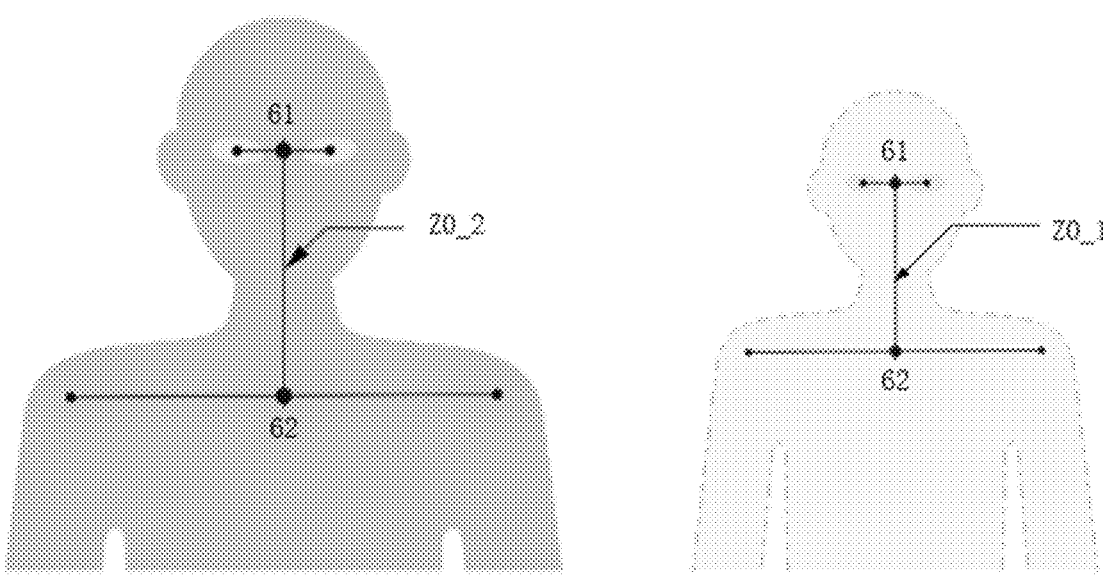
FIG. 6 is a schematic diagram illustrating a comparison between two different distances from a target object to a user interface according to an embodiment of the present disclosure.

FIG. 6 is a schematic diagram illustrating a comparison between two different distances from a target object to a user interface according to an embodiment of the present disclosure. As shown in FIG. 6, the target key point may select a central point 61 of two pupils of the target object, and a length z0 of the line connecting a depth distance reference point 62 and a central point 61 of two pupils of one target object may be used as an initial scaling factor z0. An initial scaling factor of the target object at the previous time is z0_1, and an initial scaling factor of the target object at the later time is z0_2. A component scaling factor z1 may be obtained by using a preset algorithm according to the initial scaling factor z0. The preset algorithm may be determined based on a mapping relationship between the scene coordinate system and the interface coordinate system and adjustment of a matching ratio parameter of some hardware devices (e.g., a camera, etc.). That is, the component scaling factor z1 may be determined by converting the initial scaling factor z0 through the mapping relationship between the scene coordinate system and the interface coordinate system and then adjusting the matching ratio parameter, where a specific matching ratio parameter is set according to an actual application scene and a selected device parameter, which is not particularly limited in the embodiment of the present disclosure.

By way of example, the component scaling factor z1_1 of the target object at the previous time, the current coordinate point V (vx, vy), the auxiliary locating point A' (0, a), the auxiliary locating point B' (0, b), the auxiliary locating point C' (xm, a), the auxiliary locating point D' (xm, b), the dimensional scaling factor m of the interface component 31, and the dimensional scaling factor f of the interface component 32 are known, the update information of the interface component 31 (that is, updated M1, M2, M3, and M4), and the update information of the interface component 32 (that is, updated F1, F2, F3, and F4) are determined. The updated M1, M2, M3 and M4 are as follows:

$$M1 = [z1\_1 \times m \times vx,\ a + z1\_1 \times m \times (vy - a)]$$

$$M2 = [xm - z1\_1 \times m \times (xm - vx),\ a - z1\_1 \times m \times (a - vy)]$$

$$M3 = [z1\_1 \times m \times vx,\ b - z1\_1 \times m \times (b - vy)]$$

$$M4 = [xm - z1\_1 \times m \times (xm - vx),\ b - z1\_1 \times m \times (b - vy)]$$

The updated F1, F2, F3, and F4 are as follows:

$$F1 = [z1\_1 \times f \times vx,\ b + z1\_1 \times f \times (b - vy)]$$

$$F2 = [xm - z1\_1 \times f \times (xm - vx),\ b - z1\_1 \times f \times (b - vy)]$$

$$F3 = [z1\_1 \times f \times vx,\ ym - z1\_1 \times f \times (ym - vy)]$$

$$F4 = [xm - z1\_1 \times f \times (xm - vx),\ ym - z1\_1 \times f \times (ym - vy)]$$

By way of example, the component scaling factor $z1\_2$ of the target object at the previous time, the current coordinate point V (vx, vy), the auxiliary locating point A' (0, a), the auxiliary locating point B' (0, b), the auxiliary locating point C' (xm, a), the auxiliary locating point D' (xm, b), the dimensional scaling factor m of the interface component 31, and the dimensional scaling factor f of the interface component 32 are known, the update information of the interface component 31 (that is, updated M1, M2, M3, and M4), and the update information of the interface component 32 (that is, updated F1, F2, F3, and F4) are determined. The updated M1, M2, M3 and M4 are as follows:

$$M1 = [z1\_2 \times m \times vx,\ a + z1\_2 \times m \times (vy - a)]$$

$$M2 = [xm - z1\_2 \times m \times (xm - vx),\ a - z1\_2 \times m \times (a - vy)]$$

$$M3 = [z1\_2 \times m \times vx,\ b - z1\_2 \times m \times (b - vy)]$$

$$M4 = [xm - z1\_2 \times m \times (xm - vx),\ b - z1\_2 \times m \times (b - vy)]$$

The updated F1, F2, F3, and F4 are as follows:

$$F1 = [z1\_2 \times f \times vx,\ b + z1\_2 \times f \times (b - vy)]$$

$$F2 = [xm - z1\_2 \times f \times (xm - vx),\ b - z1\_2 \times f \times (b - vy)]$$

$$F3 = [z1\_2 \times f \times vx,\ ym - z1\_2 \times f \times (ym - vy)]$$

$$F4 = [xm - z1\_2 \times f \times (xm - vx),\ ym - z1\_2 \times f \times (ym - vy)]$$

Here, a, b, f, and m are constants, and may be set according to design requirements, which are not particularly limited in the embodiment of the present disclosure.

In the embodiment, the target key point is found by using the face features, the depth distance reference point is found by using the shoulder features, and the line connecting the target key point and the depth distance reference point is used as the reference condition for scaling the interface component, to realize scaling of the interface component, so that the relatively real 3D interaction effect is simulated in the 2D display mode, the hardware resources of the system are saved, and the compatibility of UI interface display and other application can be better realized.

In some embodiments, the information determination unit 122 is specifically configured to identify a pupil feature in the face, and take a point of a middle position of two pupils as a target key point according to positions of the two pupils in the scene coordinate system in a case where it is determined through the face recognition that the target object is present. A central point of the two pupils is selected as the target key point to position the target object more accurately. In addition, the pupil feature has a higher differentiation degree, so that the face recognition and locating are easy to perform.

In some embodiments, as shown in FIGS. 4a and 4b, the user interface includes at least one layer, including the background layer 403; the interface component includes the background image 43. The system control module 102 further includes an interface control unit configured to control the display module 103 to display the background image in the background layer.

Figure 7:
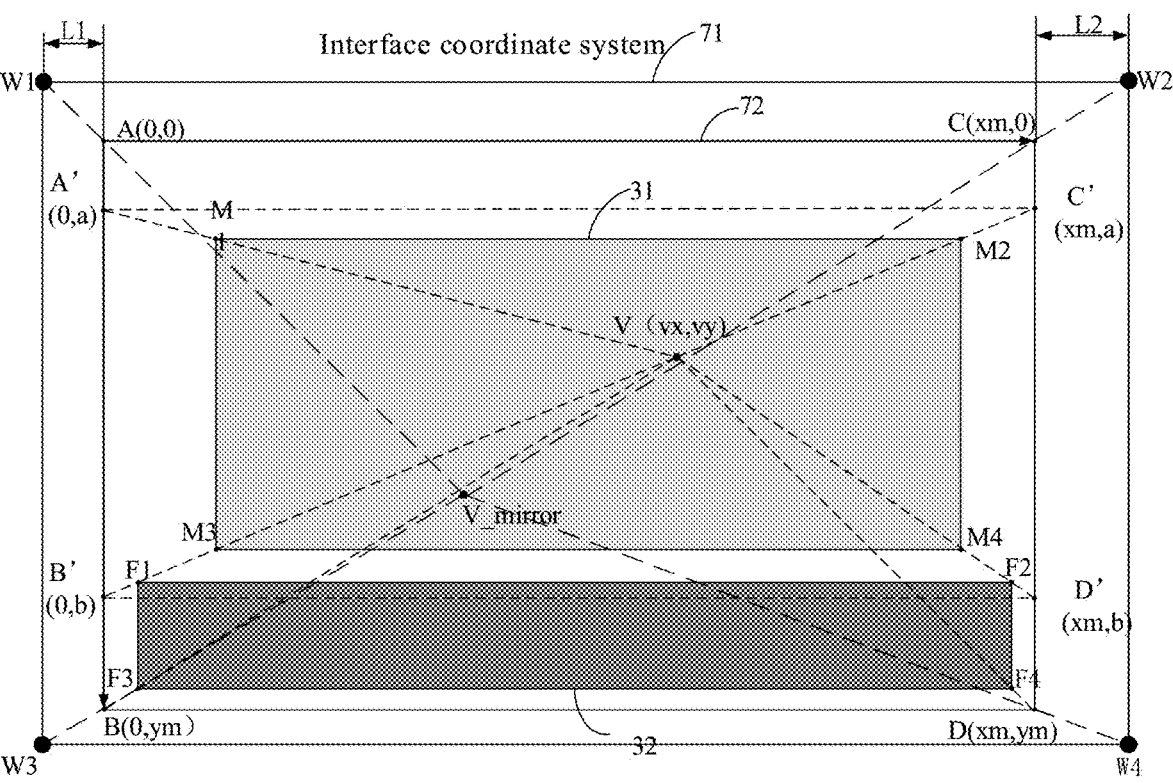
FIG. 7 is a schematic diagram illustrating a positional relationship between a background image and a vertex of a visual window on an interface coordinate system according to an embodiment of the present disclosure.

In some embodiments, FIG. 7 is a schematic diagram illustrating a positional relationship between a background image and a vertex of a visual window on an interface coordinate system according to an embodiment of the present disclosure. As shown in FIG. 7, the figure number 71 indicates the background image. In order to enhance a sense of space, the background image 71 also changes along with the target object. In order to ensure that an edge of the background image 71 is not exposed in the visual window 72 during the movement, it is necessary to set a suitable size of the background image 71, which is necessarily larger than that of the visual window.

The system control module 102 further includes a second pre-processing unit; the second pre-processing unit is configured to determine size information of the background image 71 according to a predefined magnification factor of the background image 71 and size information of the visual window 72.

As shown in FIG. 7, the size information of the visual window 72 includes coordinate information of each vertex of the visual window 72, and coordinates of vertexes of the visual window 72 are A (0, 0), B (0, ym), C (xm, 0), and D (xm, ym). The background image 71 has the magnification factor p, which may be set according to actual design requirements, and is not particularly limited in the embodiment of the present disclosure. p=L1+L2. The size information of the background image 71 includes a width Wx and a height Wy, and a size of the background image 71 is magnified proportionally to a size of the visual window 72, satisfying Wx/xm=Wy/ym. The background image 71 has the width Wx=xm+p and the height Wy=(ym+ym/xm×p). The size information of the background image 71 further includes coordinate information of each vertex of the background image 71, and coordinates of vertexes of the background image 71 are W1, W2, W3, and W4. The coordinates of the vertexes of the background image 71 change as the current coordinate point is updated. Initially, a geometric center of the background image 71 coincides with a geometric center of the visual window 72.

In some embodiments, the target object includes a person. The detection unit 121 is specifically configured to perform a face recognition on the scene picture and determine whether the target object is present. In particular, some features may be selected that are capable of representing a higher intelligibility of the person, such as a facial feature (including a feature of five sense organs), a head feature, a torso feature, or the like. Optionally, the detection unit 121 is specifically configured to perform face recognition on the scene picture, and determine whether the target object is present. Specifically, the face features in the scene picture are identified, it is judged whether a picture feature meeting the face features is present or not. If the picture feature meeting the face features is present, it is determined that the target object is present, and otherwise, it is determined that the target object is not present.

The current position includes a target key point. The information determination unit 122 is specifically configured to track the target object and determine a target key point in the face according to a face feature of the target object in a case where it is determined through the face recognition that the target object is present. For example, in the case where it is determined that the target object is present, the two-dimensional coordinate point of the target object in the scene coordinate system is located in real time, thereby achieving the target trajectory tracking. Meanwhile, the target key point in the human face is determined according to the face features of the target object, such as the feature of the five sense organs, specific face bones or the like. The target key point may be, for example, a two-dimensional coordinate point of the detected five sense organs in the scene coordinate system, a two-dimensional coordinate point of a bone key point in the scene coordinate system, or the like.

The information determination unit 122 is specifically configured to determine a current coordinate point corresponding to the target key point according to the target key point and a mapping relationship between the scene coordinate system and the interface coordinate system. For example, according to the mapping relationship between the scene coordinate system and the interface coordinate system, the target key point in the scene coordinate system is mapped into the interface coordinate system, and the mapped current coordinate point is determined.

The predefined auxiliary parameter information further includes the size information of the visual window of the predefined user interface, the magnification factor and the size information of the predefined background image. The update information generation unit 123 is further configured to determine an auxiliary reference point at which the current coordinate point is centrosymmetric with respect to the geometric center of the visual window according to the current coordinate point and the size information of the visual window; and generate the update information of the background image according to the size information of the visual window, the magnification factor of the background image, the auxiliary reference point and the size information of the background image.

As shown in FIG. 7, the auxiliary reference point V_mirror varies with the tracked current coordinate point V(vx, vy). At any time, the auxiliary reference point V_mirror and the current coordinate point V(vx, vy) are centrosymmetric with respect to the geometric center of the visual window. A position coordinate of the auxiliary reference point V_mirror in the interface coordinate system is (xm-vx, ym-vy). At any time, the point V_mirror, a point A and a point W1 are all located on a same straight line, and the point V_mirror, a point C and a point W2 are all located on a same straight line, the point V_mirror, a point B and a point W3 are located on a same straight line, and the point V_mirror, a point D and a point W4 are all located on a same straight line. Therefore, the position of the background image is continuously updated as the current coordinate point V is continuously changed. Specifically, a coordinate of the point W1 of the background image is [−p/xm×(xm−vx), −p/xm× (ym−vy)].

In the embodiment, the size of the background image is magnified, the position of the background image is updated along with the position of the target object, so that the sense of space of the UI interface is improved, and the interactive experience of the user is improved.

The user interface display system has been described as above.

The embodiment of the present disclosure further provides a user interface display method, a main body performing the method may be a terminal device integrated with the user interface display system. The user interface display method may be applied to a large-screen terminal. The "large screen" may be understood as a display screen with a large screen size and a high resolution, such as an ultra high definition display screen with a screen size of more than 40 inches and a resolution of 8K.

FIG. 8 is a flowchart of a user interface display method according to an embodiment of the present disclosure. As shown in FIG. 8, the method includes steps S11 to S15, specifically:

S11, acquiring a scene picture, and detecting whether a target object is present in the scene picture.

It should be noted that for a specific implementation process of step S11, reference may be made to the above description of the image acquisition module 101 and the detection unit 121 in the system control module 102 in the user interface display system, and repeated descriptions are omitted.

S12, tracking the target object and determining a current position of the target object in a scene in a case where the target object is present.

It should be noted that for a specific implementation process of step S12, reference may be made to the above description of the information determination unit 122 in the system control module 102, and repeated descriptions are not repeated.

S13, determining a current coordinate point of the current position mapped to an interface coordinate system of a user interface according to the current position of the target object in the scene and a mapping relationship between a pre-established scene coordinate system and the interface coordinate system.

It should be noted that for a specific implementation process of step S13, reference may be made to the above description of the information determination unit 122 in the system control module 102, and repeated descriptions are not repeated.

S14, generating update information of interface components in the user interface according to the current coordinate point and predefined auxiliary parameter information.

It should be noted that for a specific implementation process of step S14, reference may be made to the above description of the update information generation unit 123 in the system control module 102, and repeated details are not repeated.

S15, displaying the interface components according to the update information.

It should be noted that for a specific implementation process of step S15, reference may be made to the above description of the display module 103, and repeated descriptions are omitted.

In some embodiments, the predefined auxiliary parameter information includes a predefined auxiliary locating point on the interface coordinate system and a dimensional scaling factor of each interface component.

For step S11, in particular, the target object includes a person. A face recognition is performed on the scene picture, and it is determined whether the target object is present or not. It should be noted that for the process, reference may be made to the specific implementation of the detection unit 121, and repeated descriptions are omitted.

For step S12, in particular, the current position includes a target key point. The target object is tracked and a target key point in the face is determined according to a face feature of the target object in a case where it is determined through the face recognition that the target object is present. It should be noted that for the process, reference may be made to the specific implementation of the information determination unit 122, and repeated descriptions are omitted.

For step S13, specifically, a current coordinate point corresponding to the target key point is determined according to the target key point and a mapping relationship between the scene coordinate system and the interface coordinate system. It should be noted that for the process, reference may be made to the specific implementation of the information determination unit 122, and repeated descriptions are omitted.

For step S14, specifically, update information of the interface components is generated according to the current coordinate point, the auxiliary locating point, and the respective dimensional scaling factors of the interface components. It should be noted that, for the process, reference may be made to the specific implementation of the update information generation unit 123, and repeated descriptions are omitted.

In some embodiments, the user interface display method further includes determining an auxiliary locating point on the interface coordinate system according to an initial coordinate point, mapped to the interface coordinate system, of an initial position of the tracked target object and an initial position of each interface component in the user interface; and determining the dimensional scaling factor of each interface component according to the auxiliary locating point, the initial coordinate point and the initial position of each interface component. It should be noted that for the process, reference may be made to the specific implementation of the first pre-processing unit, and repeated descriptions are omitted.

In some embodiments, the user interface includes layers using the same interface coordinate system; the user interface having the layers includes a foreground layer and a background layer, and at least one intermediate layer located between the foreground layer and the background layer; a plurality of interface components are included.

Specifically, the user interface display method further includes displaying different interface components in the foreground layer, the middle layer, and the background layer. It should be noted that for the process, reference may be made to the specific implementation of the interface control unit, and repeated descriptions are omitted.

In some embodiments, for step S14, specifically, a component selection instruction for selecting an interface component is received, the dimensional scaling factor of the currently selected interface component is replaced with a target scaling factor, and the update information of each interface component is generated according to the current coordinate point, the replaced target scaling factor and the auxiliary locating point on the predefined interface coordinate system. It should be noted that for the process, reference may be made to the specific implementation of the update information generation unit 123, and repeated descriptions are omitted.

In some embodiments, for step S14, specifically, a component selection instruction for selecting an interface component is received, and a predefined dimensional scaling factor of each interface component is acquired; the dimensional scaling factor of the currently selected interface component is replaced with the dimensional scaling factor of the interface component positioned in the foreground layer in the case where the currently selected interface component is not positioned in the foreground layer of the user interface; and the update information of each interface component is generated according to the current coordinate point, the replaced dimensional scaling factor and the auxiliary locating point on the predefined interface coordinate system. It should be noted that for the process, reference may be made to the specific implementation of the update information generation unit 123, and repeated descriptions are omitted.

In some embodiments, for step S12, in particular, the current position includes a target key point and a depth distance reference point. The information determination unit 122 is specifically configured to track the target object and determine a target key point in the face according to a face feature of the target object in a case where it is determined through the face recognition that the target object is present; identify a shoulder feature of the target object, and take a point of a middle position of two shoulders as a depth distance reference point according to positions of the two shoulders in the scene coordinate system. It should be noted that for the process, reference may be made to the specific implementation of the information determination unit 122, and repeated descriptions are omitted.

For step S12, specifically, a component scaling factor is determined from the depth distance reference point and the target key point; and the update information of each interface component is generated according to the component scaling factor, the current coordinate point, the auxiliary locating point on the predefined interface coordinate system and the dimensional scaling factor of each interface component. It should be noted that for the process, reference may be made to the specific implementation of the update information generation unit 123, and repeated descriptions are omitted.

In some embodiments, for step S12, specifically, a pupil feature in the face is identified, and a point of a middle position between two pupils is taken as a target key point according to positions of the two pupils in the scene coordinate system in a case where it is determined through the face recognition that the target object is present. It should be noted that for the process, reference may be made to the specific implementation of the information determination unit 122, and repeated descriptions are omitted.

In some embodiments, the user interface includes at least one layer, including the background layer; the interface component includes the background image.

Specifically, the user interface display method further includes controlling the display module 103 to display a background image in the background layer. It should be noted that for the process, reference may be made to the specific implementation of the interface control unit, and repeated descriptions are omitted.

In some embodiments, the predefined auxiliary parameter information further includes size information of a visual window of the predefined user interface, a magnification factor and size information of the predefined background image.

For step S11, in particular, the target object includes a person; and a face recognition is performed on the scene picture, to determine whether the target object is present or not. It should be noted that for the process, reference may be made to the specific implementation of the detection unit 121, and repeated descriptions are omitted.

For step S12, specifically, the current position includes a target key point. The target object is tracked and a target key point in the face is determined according to a face feature of the target object in a case where it is determined through the face recognition that the target object is present. It should be noted that for the process, reference may be made to the specific implementation of the information determination unit 122, and repeated descriptions are omitted.

For step S13, specifically, a current coordinate point corresponding to the target key point is determined according to the target key point and a mapping relationship between the scene coordinate system and the interface coordinate system. It should be noted that for the process, reference may be made to the specific implementation of the information determination unit 122, and repeated descriptions are omitted.

For step S14, the method further includes: an auxiliary reference point at which the current coordinate point is centrosymmetric with respect to the geometric center of the visual window is determined according to the current coordinate point and the size information of the visual window; and the update information of the background image is generated according to the size information of the visual window, the magnification factor of the background image, the auxiliary reference point and the size information of the background image. It should be noted that for the process, reference may be made to the specific implementation of the update information generation unit 123, and repeated descriptions are omitted.

In some embodiments, the user interface display method further includes determining size information of the background image according to the size information of the visual window and the magnification factor of the background image. It should be noted that for the process, reference may be made to the specific implementation of the second pre-processing unit, and repeated descriptions are omitted.

FIG. 9 is a schematic diagram of a structure of a computer device according to an embodiment of the present disclosure. As shown in FIG. 9, an embodiment of the present disclosure provides a computer device, including: one or more processors 901, a memory 902, and one or more I/O interfaces 903. The memory 902 has one or more programs stored thereon that, when executed by the one or more processors, cause the one or more processors to implement the user interface display method in the embodiments described above; one or more I/O interfaces 903 are connected between the processors 901 and the memory 902 and configured to enable information interaction of the processors 901 and the memory 902.

Each processor 901 is a device with data processing capability, includes, but is not limited to, a central processing unit (CPU) or the like; the memory 902 is a device with data storage capability, includes, but is not limited to, a random access memory (RAM, such as SDRAM, DDR, etc.), a read-only memory (ROM), an electrically erasable programmable read-only memory (EPROM), and a FLASH; each I/O interface (read/write interface) 903 is connected between the processors 901 and the memory 902, and may implement enable information interaction of the processors 901 and the memory 902, and includes, but is not limited to, a data bus (bus) or the like.

In some embodiments, the processors 901, the memory 902, and the I/O interfaces 903 are connected to each other through the bus 904, and in turn to other components of the computing device.

According to an embodiment of the present disclosure, a non-transitory computer-readable storage medium is further provided. The non-transitory computer-readable storage medium has a computer program stored thereon, wherein the computer program, when executed by a processor, implements the steps in the user interface display method as in any one of the above embodiments.

In particular, the processes described above with reference to the flowchart may be implemented as computer software programs, according to embodiments of the present disclosure. For example, embodiments of the present disclosure include a computer program product, including a computer program embodied on a machine-readable medium, and the computer program includes program code for performing the method illustrated in the flowchart. In the embodiment, the computer program may be downloaded from a network via a communication portion and installed, and/or installed from a removable medium. The above functions defined in the system of the present disclosure are performed when the computer program is executed by the central processing unit (CPU).

It should be noted that, the non-transitory computer-readable storage medium in the present disclosure may be a computer-readable signal medium or a computer-readable storage medium or any combination of the two. The computer-readable storage medium may be, for example, but not limited to, an electronic, magnetic, optical, electromagnetic, infrared, or semiconductor system, apparatus, or device, or any combination thereof. More specific examples of the computer-readable storage medium may include, but are not limited to: an electrical connection having one or more wires, a portable computer diskette, a hard disk, a random access memory (RAM), a read-only memory (ROM), an erasable programmable read-only memory (erasable EPROM or flash), an optical fiber, a portable compact disc read-only memory (CD-ROM), an optical storage device, a magnetic storage device, or any suitable combination thereof. In the present disclosure, the computer-readable storage medium may be any tangible medium that may contain, or store a program for use by or in connection with an instruction execution system, apparatus, or device. In the present disclosure, a computer-readable signal medium may include a propagated data signal with computer-readable program code embodied therein, for example, in baseband or as part of a carrier wave. Such a propagated data signal may take any of a variety of forms, including, but not limited to, electro-magnetic, optical, or any suitable combination thereof. Except for the computer-readable storage medium, the computer-readable signal medium may be any non-transitory computer-readable storage medium that may communicate, propagate, or transport a program for use by or in connection with an instruction execution system, apparatus, or device. Program code embodied on the non-transitory computer-readable storage medium may be transmitted using any appropriate medium, including, but not limited to: wireless, wire, fiber optic cable, RF, etc., or any suitable combination thereof.

The flowchart and block diagrams in the drawings illustrate architecture, functionality, and operation of possible implementations of a system, a method and a computer program product according to various embodiments of the present disclosure. In this regard, each block in the flowchart or block diagrams may represent a module, program segment(s), or a portion of a code, which includes one or more executable instructions for implementing specified logical function(s). It should also be noted that in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

It should be understood that, the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A user interface display system, comprising an image acquisition module, a system control module and a display module;

wherein the image acquisition module is configured to acquire a scene picture;

the system control module is configured to detect whether a target object is present in the scene picture, and track the target object and determine a current position of the target object in a scene in a case that the target object is present; determine a current coordinate point of the current position mapped to an interface coordinate system of a user interface according to the current position of the target object in the scene and a mapping relationship between a pre-established scene coordinate system and the interface coordinate system; and generate update information of at least one interface component in the user interface according to the current coordinate point and predefined auxiliary parameter information; and the display module is configured to display the at least one interface component according to the update information.

2. The user interface display system of claim 1, wherein the system control module comprises a detection unit, an information determination unit, and an update information generation unit;

the detection unit is configured to detect whether the target object is present in the scene picture;

the information determination unit is configured to track the target object and determine the current position of the target object in the scene in a case that the target object is present; and determine the current coordinate point of the current position mapped to the interface coordinate system according to the current position of the target object in the scene and the mapping relationship between the pre-established scene coordinate system and the interface coordinate system; and the update information generation unit is configured to generate the update information of the at least one interface component in the user interface according to the current coordinate point and the predefined auxiliary parameter information.

3. The user interface display system of claim 2, wherein the predefined auxiliary parameter information comprises a predefined auxiliary locating point on the interface coordinate system and a dimensional scaling factor of each of the at least one interface component;

the target object comprises a person; the detection unit is configured to perform face recognition on the scene picture and determine whether the target object is present;

the current position comprises a target key point; the information determination unit is configured to track the target object and determine a target key point in the face according to a face feature of the target object in a case where it is determined by the face recognition that the target object is present; and determine a current coordinate point corresponding to the target key point according to the target key point and a mapping relationship between the scene coordinate system and the interface coordinate system; and the update information generation unit is configured to generate the update information of the at least one interface component according to the current coordinate point, the auxiliary locating point, and the dimensional scaling factor of each of the at least one interface component.

4. The user interface display system of claim 3, wherein the system control module further comprises a first pre-processing unit; and the first pre-processing unit is configured to determine an auxiliary locating point on the interface coordinate system according to an initial coordinate point, mapped to the interface coordinate system, of an initial position of the tracked target object and an initial position of each of the at least one interface component in the user interface; and determine the dimensional scaling factor of each of the at least one interface component according to the auxiliary locating point, the initial coordinate point and the initial position of each of the at least one interface component.

5. The user interface display system of claim 2, wherein the user interface comprises layers using the same interface coordinate system; the user interface having the layers comprises a foreground layer and a background layer, and at least one intermediate layer between the foreground layer and the background layer; and the at least one interface component comprises a plurality of interface components; and the system control module further comprises an interface control unit; the interface control unit is configured to control the display module to display different interface components in the foreground layer, the middle layer, and the background layer.

6. The user interface display system of claim 5, wherein the update information generation unit is configured to receive a component selection instruction for selecting an interface component, replace a dimensional scaling factor of the currently selected interface component with a target scaling factor, and generate the update information of each interface component according to the current coordinate point, the replaced target scaling factor and the predefined auxiliary locating point on the interface coordinate system.

7. The user interface display system of claim 5, wherein the update information generation unit is configured to receive a component selection instruction for selecting an interface component, and acquire a predefined dimensional scaling factor of each interface component; replace the dimensional scaling factor of the currently selected interface component with the dimensional scaling factor of the interface component in the foreground layer in a case where the currently selected interface component is not in the foreground layer of the user interface; and generate the update information of each interface component according to the current coordinate point, the replaced dimensional scaling factor and the predefined auxiliary locating point on the interface coordinate system.

8. The user interface display system of claim 2, wherein the current position comprises a target key point and a depth distance reference point; the information determination unit is configured to track the target object and determine a target key point in a face according to a face feature of the target object in a case where it is determined by face recognition that the target object is present; identify a shoulder feature of the target object; and take a point of a middle position between two shoulders as a depth distance reference point according to positions of the two shoulders in the scene coordinate system; and the update information generation unit is configured to determine a component scaling factor based on the depth distance reference point and the target key point; and generate the update information of each interface component according to the component scaling factor, the current coordinate point, the predefined auxiliary locating point on the interface coordinate system and the dimensional scaling factor of each interface component.

9. The user interface display system of claim 3, wherein the information determination unit is configured to identify a pupil feature in the face, and take a point of a middle position between two pupils as the target key point according to positions of the two pupils in the scene coordinate system in a case where it is determined by the face recognition that the target object is present.

10. The user interface display system of claim 2, wherein the user interface comprises at least one layer, which comprises a background layer; the interface component comprises a background image; and the system control module further comprises an interface control unit configured to control the display module to display the background image in the background layer.

11. The user interface display system of claim 10, wherein the predefined auxiliary parameter information further comprises predefined size information of a visual window of the user interface, a predefined magnification factor of the background image and size information of the background image;

the target object comprises a person; the detection unit is configured to perform face recognition on the scene picture and determine whether the target object is present;

the current position comprises a target key point; the information determination unit is configured to track the target object and determine a target key point in a face according to a face feature of the target object in a case where it is determined by the face recognition that the target object is present; and determine a current coordinate point corresponding to the target key point according to the target key point and a mapping relationship between the scene coordinate system and the interface coordinate system; and the update information generation unit is further configured to determine an auxiliary reference point at which the current coordinate point is centrosymmetric with respect to a geometric center of the visual window according to the current coordinate point and the size information of the visual window; and generate the update information of the background image according to the size information of the visual window, the magnification factor of the background image, the auxiliary reference point and the size information of the background image.

12. The user interface display system of claim 11, wherein the system control module further comprises a second pre-processing unit; and the second pre-processing unit is configured to determine the size information of the background image according to the size information of the visual window and the magnification factor of the background image.

13. The user interface display system of claim 1, wherein the interface component comprises at least one of a control, a status bar, a card bar, a background image.

14. A user interface display method, comprising:

acquiring a scene picture, and detecting whether a target object is present in the scene picture;

tracking the target object and determining a current position of the target object in a scene in a case where the target object is present;

determining a current coordinate point of the current position mapped to an interface coordinate system of a user interface according to the current position of the target object in the scene and a mapping relationship between a pre-established scene coordinate system and the interface coordinate system;

generating update information of at least one interface component in the user interface according to the current coordinate point and predefined auxiliary parameter information; and displaying the at least one interface component according to the update information.

15. A computer device, comprising: a processor, a memory and a bus, wherein the memory stores machine-readable instructions executable by the processor; the processor and the memory is communicated with each other over the bus when the computer device is running; and the machine-readable instructions, when executed by the processor, perform the user interface display method of claim 14.

16. A non-transitory computer-readable storage medium with a computer program stored thereon, wherein the computer program, when being executed by a processor, performs the user interface display method of claim 14.

17. The user interface display system of claim 8, wherein the information determination unit is configured to identify a pupil feature in the face, and take a point of a middle position between two pupils as the target key point according to positions of the two pupils in the scene coordinate system in a case where it is determined by the face recognition that the target object is present.

18. The user interface display method of claim 14, wherein the predefined auxiliary parameter information comprises a predefined auxiliary locating point on the interface coordinate system and a dimensional scaling factor of each of the at least one interface component; and the target object comprises a person;

the user interface display method further comprises performing face recognition on the scene picture and determine whether the target object is present;

the current position comprises a target key point;

the tracking the target object and determining a current position of the target object in a scene in a case where the target object is present comprises tracking the target object and determining a target key point in a face according to a face feature of the target object in a case where it is determined by the face recognition that the target object is present;

the determining a current coordinate point of the current position mapped to an interface coordinate system of a user interface according to the current position of the target object in the scene and a mapping relationship between a pre-established scene coordinate system and the interface coordinate system comprises determining a current coordinate point corresponding to the target key point according to the target key point and a mapping relationship between the scene coordinate system and the interface coordinate system; and the generating update information of at least one interface component in the user interface according to the current coordinate point and predefined auxiliary parameter information comprises generating the update information of the at least one interface component according to the current coordinate point, the auxiliary locating point, and the dimensional scaling factor of each of the at least one interface component.

19. The user interface display method of claim 18, further comprising:

determining an auxiliary locating point on the interface coordinate system according to an initial coordinate point, mapped to the interface coordinate system, of an initial position of the tracked target object and an initial position of each of the at least one interface component in the user interface; and determining the dimensional scaling factor of each of the at least one interface component according to the auxiliary locating point, the initial coordinate point and the initial position of each of the at least one interface component.

20. The user interface display method of claim 14, wherein the user interface comprises layers using the same interface coordinate system; the user interface having the layers comprises a foreground layer and a background layer, and at least one intermediate layer between the foreground layer and the background layer; and the at least one interface component comprises a plurality of interface components; and the method further comprises displaying different interface components in the foreground layer, the middle layer, and the background layer.

* * * * *